(12) United States Patent
Yeung

(10) Patent No.: US 10,219,564 B2
(45) Date of Patent: Mar. 5, 2019

(54) METHOD OF MANUFACTURING FUNCTIONAL FABRIC

(71) Applicant: AP TRENNEL LIMITED, Tsuen Wan, NT, Hong Kong (CN)

(72) Inventor: Kim Ching Yeung, Hong Kong (CN)

(73) Assignee: AP TRENNEL LIMITED, Hong Kong (CN)

(*) Notice: Subject to any disclaimer, the term of this patent is extended or adjusted under 35 U.S.C. 154(b) by 209 days.

(21) Appl. No.: 15/211,546

(22) Filed: Jul. 15, 2016

(65) Prior Publication Data

US 2017/0135427 A1    May 18, 2017

(30) Foreign Application Priority Data

Nov. 13, 2015 (CN) .......................... 2015 1 0776490

(51) Int. Cl.

| | |
|---|---|
| *B29C 41/20* | (2006.01) |
| *B29C 41/22* | (2006.01) |
| *B29C 70/68* | (2006.01) |
| *A41D 31/02* | (2019.01) |
| *B33Y 10/00* | (2015.01) |
| *B33Y 70/00* | (2015.01) |
| *B33Y 80/00* | (2015.01) |
| *B28B 1/00* | (2006.01) |
| *B29C 43/20* | (2006.01) |
| *A41D 7/00* | (2006.01) |
| *A41C 3/00* | (2006.01) |

(Continued)

(52) U.S. Cl.
CPC ................ *A41D 31/02* (2013.01); *A41C 3/00* (2013.01); *A41D 7/00* (2013.01); *A41D 13/0015* (2013.01); *B28B 1/001* (2013.01); *B29C 43/203* (2013.01); *B29C 64/106* (2017.08); *B29C 64/112* (2017.08); *B29C 64/118* (2017.08); *B33Y 10/00* (2014.12); *B33Y 70/00* (2014.12); *B33Y 80/00* (2014.12); *B29K 2105/0061* (2013.01); *B29K 2667/00* (2013.01); *B29L 2031/726* (2013.01)

(58) Field of Classification Search
CPC ....... B29C 41/20; B29C 41/22; B29C 64/106; B29C 64/112; B29C 64/118; B29C 70/68
USPC .................. 264/129, 257, 259, 308
See application file for complete search history.

(56) References Cited

U.S. PATENT DOCUMENTS

| | | | |
|---|---|---|---|
| 2005/0059757 A1* | 3/2005 | Bredt ..................... | B33Y 10/00 524/3 |
| 2014/0020191 A1* | 1/2014 | Jones .................... | B29C 64/106 12/142 R |

(Continued)

FOREIGN PATENT DOCUMENTS

CN        103041505 A       4/2013

OTHER PUBLICATIONS

SIPO Office Action corresponding to CN Application No. 201510776490.9; dated Aug. 30, 2018.

*Primary Examiner* — Leo B Tentoni
(74) *Attorney, Agent, or Firm* — Cantor Colburn LLP

(57) ABSTRACT

The present invention relates to a functional fabric, comprising: a substrate layer, said substrate layer including a cloth and a functional layer on said substrate layer, said functional layer including a silica gel masterbatch and anion additives, and having a three-dimensional configuration, wherein said functional layer has a thickness such that said functional fabric is capable of releasing a concentration of 1,000-6,000 anions per cubic centimeter.

3 Claims, 10 Drawing Sheets
(9 of 10 Drawing Sheet(s) Filed in Color)

(51) Int. Cl.
*A41D 13/00* (2006.01)
*B29C 64/106* (2017.01)
*B29C 64/118* (2017.01)
*B29C 64/112* (2017.01)
B29K 667/00 (2006.01)
B29K 105/00 (2006.01)
B29L 31/00 (2006.01)

(56) References Cited

U.S. PATENT DOCUMENTS

2014/0020192 A1* 1/2014 Jones .................... B29C 64/112
                                                    12/146 B
2017/0028432 A1* 2/2017 Miller ................. B29C 71/0009

* cited by examiner

METHOD OF MANUFACTURING FUNCTIONAL FABRIC

CROSS REFERENCE TO RELATED APPLICATIONS

The present invention claims priority under 35 U.S.C. § 119 to Chinese Application No. 201510776490.9, filed on Nov. 13, 2015, the entire content of which is incorporated herein by reference.

FIELD OF THE INVENTION

This invention relates to a kind of functional fabric that is capable of releasing a high concentration of anion and the manufacturing method thereof, and especially to a kind of functional fabric incorporated with three-dimensional silica gel structure that is capable of releasing a high concentration of anion and the manufacturing method thereof.

BACKGROUND OF THE INVENTION

In the atmosphere, some air molecules can emit electrons under the effect of cosmic rays, ultraviolet light, soil and air radiation in the nature. These electrons combine with neutral molecules in the air and become anion.

Concentration of anion in the air is one of the benchmark of air quality. According to standard laid down by World Health Organization, concentration of negative oxygen ions in fresh air will not be lower than 1,000-1,500 per cubic centimeter. Practically, people have found out that anion is an effective means to kill bacteria, improve air quality and improve health condition. When integrating with bacteria, anion can electrify the bacteria and makes it easier to precipitate and be removed. On the other hand, anion also acts as a reducing agent to react with bacteria, causing bacteria to change its structure or transfer its energy to achieve the effect of sterilization. Study of US Environmental Protection Agency (EPA) laboratory shows that through the Brownian motion in the air, anion can take the initiative to capture dust pellets, makes it agglomerate and precipitate, effectively removing micro dust of 2.5 micrometers (PM2.5) or less, or even 1 micrometer in the air, thereby reducing the hazards of PM2.5 to human health. Study also finds that when the concentration of anion reaches 20,000 per cubic centimeter indoor, the amount of floating dusts in the air will be reduced by more than 98%, in particular, the micro dust, bacteria and viruses of less than 1 micrometer in PM2.5 which cause the most hazards will become almost zero. In addition, anion also has an impact on human body's physiological activities through nervous system and blood circulation. Anion can reinforce the suppress on the human cerebral cortex process to strengthen and adjust the cerebral cortex function, leading to sedative, hypnotic and hypotensive effect; the negative oxygen ion can smoothen and relax the bronchial smooth muscle and relieve its spasm when entering the human respiratory tract; when negative oxygen ion enters blood, it will slow down the sedimentation rate of red blood cell and prolong the clotting time. It can also increase red blood cells and calcium content while reducing white blood cells, calcium and blood sugar. The content of lactic acid in fatigue muscle will also be reduced. Negative oxygen ion can also reinforce the process of oxidation of the body's kidney, liver and brain.

The concentration of anion in the air can be different depending on geographical conditions. Table 1 shows the concentrations of anion in common environments. It can be seen that natural environments such as waterfalls, forests, mountains and coastal area have higher concentration of anion while urban environments such as parks, streets and office have lower anion concentration, even cannot reach the standard of fresh air set by WHO.

TABLE 1

Anion Concentration in different environments

| Location | Anion concentration (per cubic centimeter) |
|---|---|
| Waterfalls, Forests | 10,000-20,000 |
| Mountains, Coasts | 5,000-10,000 |
| Parks | 400-1,000 |
| Streets | <200 |
| Offices, Vehicles | 60-150 |

Therefore, taking into account the beneficial effects of anion and the reality of lower anion concentration in human living environment, it is desirable to provide means to produce anion artificially. It is more desirable to carry on the means that can produce anion artificially. A preferred means is to manufacture wearable device which can release anion, especially clothing.

There are several methods in the prior art to manufacture wearable device or clothing which can release anion. One of the methods is to produce wearable device or clothing directly using materials that can release anion. CN101513276A discloses the anion silicone rubber made bra. The bra uses silicone rubber as a carrier and mixes it with 0.1% to 3% chemical powder that can generates anion; or produce a pad using silicone rubber and anion chemical powder and insert it into an ordinary bra. Another method is the production of functional fabric that can release anion. CN103643375A discloses a blended anion fiber fabric. The fabric is blended weaved by four kinds of fabric fibers, namely the nanocomposite ceramic fiber, nano-antibacterial wool fibers, nano-bamboo fiber and rayon fiber. These nanofibers accounted for 47-59% of the fabric weight, and are claimed to be capable of releasing anion.

However, there are some defects in the aforementioned methods. Regarding the first method, clothes entirely made with silicone and anion powders are often not comfortable, they are always relatively heavy, and the texture is not as comfortable as fabric. With respect to the second method, the functional component content that can truly release anion tends to be relatively low, resulting in low concentration of anion. The applicant also finds that among the clothes made with these functional fabrics, the anion is mainly generated by friction between the fabrics. In other words, when people are in static environment such as sleeping or working, the functional fabrics release almost no anion.

BRIEF DESCRIPTION OF THE INVENTION

In view of the above, the present invention discloses a new functional fabric that is capable of releasing a high concentration of anion in a static condition, and the clothing made with this kind of functional fabric is more comfortable to wear.

The present invention solves the above technical problems with the following technical solutions.

In one embodiment, the present invention discloses a functional fabric comprising: a substrate layer, the fabric layer including a cloth and a functional layer on the substrate layer, the functional layer including a silica gel masterbatch and anion additives, and having a three-dimensional configuration, wherein the functional layer has a thickness such that the functional fabric is capable of releasing an anion concentration of 1,000-6,000 per cubic centimeter.

In a further embodiment, the functional layer has a thickness such that the functional fabric is capable of releasing an anion concentration of 2,000-5,000 per cubic centimeter.

In a further embodiment, the functional layer has a thickness such that the functional fabric is capable of releasing an anion concentration of 3,000 anions per cubic centimeter.

In a further embodiment, the functional layer has a cross-section of honeycomb pattern, star pattern, sun pattern or decorative pattern.

In a further embodiment, the functional layer has a longitudinal-section of a protruding shape.

In a further embodiment, the thickness of the functional layer is uneven on the fabric surface.

In a further embodiment, the functional layer only is only applied to one or more areas of the substrate layer.

In a further embodiment, the functional layer further comprises a nano-heating film, the nano-heating film including nano-particles of composite carbon fiber powder applied onto an insulating polyester film.

In a further embodiment, the anion additives including powder of ZnS, CaO, CePO4, Th(NO3)4 and LaNO3.

In a further embodiment, the functional layer further including one or more additional additives of heat-releasing materials, far-infrared materials, antibacterial materials, aromatic material and reinforcing materials.

In a further embodiment, the heat-releasing materials including nano-particles of composite carbon fiber powder.

In one embodiment, the present invention discloses a garment made with the aforementioned functional fabric.

In a further embodiment, the garment is sportswear, swimwear, bra, mask or bandage.

In a further embodiment, the garment has a centralized functional layer on one or more regions of the neck, shoulders, back, waist, thighs, legs and knees.

In one embodiment, the present invention discloses a 3D printing method for manufacturing a functional fabric, comprising the following steps: (a) providing a cloth as a substrate layer of the functional fabric, (b) modelling a functional layer of the functional fabric on a computer, (c) providing, melting and mixing a silica gel masterbatch and anion additives, and (d) 3D printing the functional layer on the substrate layer using a 3D printer.

In a further embodiment, the aforementioned 3D printing method further comprises the following step: (e) providing one or more additional additives (6) of heat-releasing materials, far-infrared materials, antibacterial materials, aromatic materials and reinforcing materials. The additional additives are melted separately or mixed and melted together with the silica gel masterbatch and anion additives, and supplied to the 3D printer.

In a further embodiment, the aforementioned 3D printing method further comprises the following step: (f) printing on different locations of the substrate layer a functional layer of varying thickness and/or varying configurations and/or varying components.

In one embodiment, the present invention discloses a compression molding method for manufacturing a functional fabric, comprising the following steps: (a) providing a cloth as a substrate layer of the functional fabric, (b) providing a silica gel masterbatch and anion additives, melts and combines, (c) press molding the melted mixture of silica gel masterbatch and anion additives onto the substrate layer to form a functional layer on a compression molding device with a mould, and (d) separating the mould.

In a further embodiment, the aforementioned molding method further comprises the following step: (e) providing one or more additional additives of heat-releasing materials, far-infrared materials, antibacterial materials, aromatic materials and reinforcing materials. The additional additives are melted separately or mixed and melted together with the silica gel masterbatch and anion additives, and then supplied to the compression molding device.

In a further embodiment, the mould defines a cavity supplementary to the configuration of the functional layer. The cavity has different depths and/or different configurations at different locations.

Through the above technical solutions, the functional fabric of the present invention can steadily release a high concentration of 1,000-6,000 anions per cubic centimeter under static conditions, and the fabric itself is not much different in terms of comfort. In addition, the fabric made of the present invention also has excellent mechanical properties. Through various experiments, the inventor shows that garment made by the fabric of the present invention has a significant effect in reducing muscle injury and relieving inflammation.

BRIEF DESCRIPTION OF THE DRAWINGS

The patent or application file contains at least one drawing executed in color. Copies of this patent or patent application publication with color drawing(s) will be provided by the Office upon request and payment of the necessary fee. For better understanding of the present invention, relevant embodiments will be described with reference to the drawings are as follow.

DETAILED DESCRIPTION OF THE DRAWINGS

Details of the fabric structure and manufacturing method thereof according to the invention will be described as follows. However, the invention does not intend to restrict the structure and method as described. Equivalent alternative methods and equipment that could be conceived by those skilled in the art with reference to the following description of the structure and method are also within the scope of protection of the invention.

Fabric Structure

Figure 1:
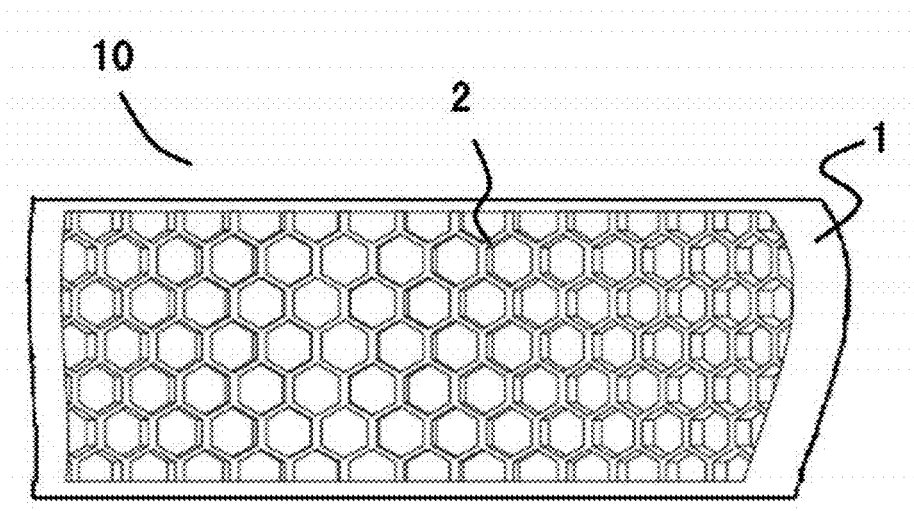
FIG. 1 shows the structure of the functional fabric based on one embodiment of the present invention.

FIG. 1 shows the structure of the functional fabric made in accordance with the present invention. In one embodiment, the functional fabric 10 made by the invention includes a substrate layer 1 and a functional layer 2. The substrate layer 1 can be common cloth such as woven fabric made with one or more of cotton, nylon, linen, natural leather, artificial leather, wool, silk, acrylic, bamboo fibers, spinning fibers, elastic fibers, acetate fibers or polyester fibers, or non-woven fabric made with one or more of them. Different fabrics can be used according to different scenarios to which the fabrics are applied, such as sportswear, underwear, masks, shoe surfaces etc.

One of the main features of functional layer 2 is its three-dimensional structure. Through the three-dimensional structure, the present invention allows the functional layer to have the largest possible volume and surface area/volume ratio. The largest possible volume enables the functional fabric of the present invention to carry far more anion additives than other similar products, and the largest possible surface area/volume enables the anion of the functional fabric of the present invention to be released steadily and effectively.

Firstly, the three-dimensional structure of functional layer 2 indicates a thickness. The thickness allows the functional fabric made by the invention to steadily release a concentration of 1000-6000 anions per cubic centimeters in a static condition, particularly 2000-5000 anions per cubic centimeters and more particularly 3500 anions per cubic centimeters.

Secondly, thickness of the functional layer in the direction perpendicular to the planar surface of the fabric may be even or uneven. As will be discussed below, varying thicknesses can bring different capability of releasing anion and mechanical characteristics to different parts of the clothing, which would be particularly advantageous.

On the other hand, the pattern of the functional layer 2 on the planar surface of the fabric may be regular or irregular. For example, functional layer 2 can have a honeycomb-shaped cross section as shown in FIG. 1. It is also possible to have a cross section of other patterns such as star-shape or sun-shape. In order to achieve aesthetic effect, functional layer 2 may also have a cross section of decorative pattern or other patterns.

Moreover, the longitudinal section of functional layer 2 can be the same or different. For example, functional layer 2 can have a protruding longitudinal section. The varying longitudinal section can form the functional layer 2 with a hollow porous configuration to further increase the surface area/volume ratio.

Also, functional layer 2 can be continuously applied throughout the substrate layer 1, or applies only to one or more parts of the substrate layer 1.

The three-dimensional structure of functional layer 2 of the functional fabric of the present invention can be changed on all the aforementioned aspects as well as in the other ways which those skilled in the art can reasonably envisage. These changes enable the functional layer 2 to have different and varying three-dimensional structures as needed, which is very helpful to maximize the effect of the anion. From the following section on technical effects, it can be appreciated that the fabric of the present invention has significant effects on reducing muscle injury caused by sport activities and relieve inflammation on parts of the body. Therefore, it is preferred to configure the functional layer 2 in a way such that when people wears the clothes made with that functional fabric 10, the functional layer can concentrate on parts of body most venerable to muscle injury or inflammation, and consequently the concentration of anion released will be the highest there. These parts of body include neck, shoulders, back, waist, thighs, legs and knees. The methods of achieving the concentration of functional layer are as aforementioned, including provides larger thickness on the aforementioned parts, a tighter pattern, a more complex three-dimensional configuration and higher levels of active ingredient.

The fabric so obtained also shows different mechanical properties at different parts. As will be discussed below, the material of the functional layer may have different mechanical properties with the substrate layer, such as higher or lower elasticity and higher wear resistance. Through the uneven and irregular three-dimensional structure of the functional layer, the mechanical properties of the substrate layer may be reinforced purposely. The clothing made by cutting on the basis of the fabric of the present invention may therefore acquire uneven and irregular mechanical properties. For example, the thicker functional layer in the elbows and knees of the clothing can provide higher wear resistance. Also for example, the abdominal region of the functional underwear may provide different components of functional layer to give the fabric a lower elasticity, resulting in better slimming effect. Another example is that in the leg area of sportswear, the functional layer may be provided with higher elasticity so that the fabric has better elasticity.

In other embodiments, the fabric made by the present invention may not be limited to one substrate layer 1 and one functional layer 2. In an embodiment, the fabric of the present invention may comprise two substrate layers 1 and one functional layer 2 therebetween. However, the inventor realizes, it is preferable to expose the functional lawyer. It guarantees high concentration of anion can be effectively released. In another embodiment, the fabric made by the present invention can consist of one substrate layer 1 and two functional layers 2 on the two sides of the substrate layer. It is preferable for application such as sportswear and functional underwear that calls for especially high concentration of anion. The functional layer 2 of the present invention is not limited to the preferred single layer structure.

Fabric Components

The main components of functional layer 2 are silica gel masterbatch and anion additives, further additives such as far-infrared materials, antibacterial materials, aromatic materials and reinforcing materials can be supplemented as needed.

The silica gel masterbatch of the present invention has various micro-porous structures. The micro-porous structures give the silica gel a strong adsorption capacity, which is particularly suitable for maintaining anion additives and other types of additives, and ensuring a stable and lasting release of anion.

Meanwhile, silicone has a stable nature. It is insoluble in water and any solvent. It does not react with any substance except alkali and hydrofluoric acid. It also has excellent flame retardant properties and does not emit smoke or toxic gases even when burning. Therefore, as a masterbatch, the silica gel can protect substrate layer 1 and other components in functional layer 2 so that the fabric of the present invention is suitable for use in a variety of complex weather conditions, and can endure being washed repeatedly in water, high temperature steam cleaning and disinfection without damaging or loss of function.

Silicone also has slow rebound characteristics which gives an excellent elasticity to the functional layer, making it particularly suitable for sportswear.

Anion additives can be in the form of paste or powder, preferably nano-powders. Anion additives may include ZnS, CaO, CePO4, Th(NO3)4 and LaNO3. Other suitable anion additives may also include natural minerals such as tourmaline, opal (aqueous colloidal or amorphous active SiO2 and a small amount of Fe2O3 and Al2O3), tourmaline (inorganic porous substance consisted of silicate, metallic oxide of aluminium and iron) and seabed minerals such as corals fossils, marine sediments and seaweed charcoal.

In a preferred embodiment, the material of the functional layer 2 further includes heat-releasing material. The inventor has found certain level of heat can increase the capacity of the anion additive to release anion. In an experiment conducted by the inventor, two groups of the functional fabric of the present invention are tested, the control group is at room temperature, and the treatment group is heated and maintained at around 28° C. The anion concentrations of the control group and the treatment group are measured after 10, 15 and 20 minutes since heating. Table 2 shows the capability of releasing anion of the functional fabric of the present invention increases by 10-25% after being heated.

TABLE 2 the effect of temperature on anion concentration

| Heating duration/min | Anion concentration/ cm3 Control group | Anion concentration/ cm3 Treatment group |
| --- | --- | --- |
| 10 | 2,135 | 2,339 |
| 15 | 2,054 | 2,582 |
| 20 | 2,150 | 2,705 |

Therefore, the present invention realizes the possibility to add heat-releasing material into the functional layer 2 to improve the anion-releasing capability of the anion additives. In one embodiment, the heat-releasing material is made from conductive nano-particles of composite carbon fiber powder. In a preferred embodiment, the nano-particles of composite carbon fiber powder is made as fluid-like material and formed on insulating polyester film to become a form of nano-heating film, as an independent layer within the functional layer 2. In another preferred embodiment, it is only necessary to mix a concentration of nano-particles of composite carbon fiber powder with the silica gel masterbatch. The heating film made from nano-particles of composite carbon fiber powder has the advantage of very high electricity-heat conversion rate (around 99%, whereas the electricity-heat conversion of a common electric blanket is around 75%), and a power source of 5V, 5 W is sufficient as a stable drive. The surface temperature is even and can reach up to 55° C. However it is preferable to maintain the temperature at 27-29° C. In addition, fabric containing nano-particles of composite carbon fiber powder does not have particular conductive path, it has an area conductive structure. Hence, some damage to the fabric surface will not affect the capability to conduct electricity and to generate heat, as the entire surface is electricity and heat conductive continuously. Besides heat releasing, the nano-particles of composite carbon fiber powder can emit far-infrared light of 8-15 μm wavelength when heated, resulting some healthcare function. The ways to energize the fabric includes an USB wire extending from the fabric. There a common portable power bank is sufficient to drive the functional fabric to generate heat.

In a preferred embodiment, the material of functional layer 2 also includes far-infrared materials. The far-infrared materials can radiate far-infrared rays of 3-15 μm wavelength at room temperature (20-50° C.), matching human infrared absorption spectrum. Studies show that when far-infrared rays are absorbed by the body, it can make the water molecules in the body resonate and activate, enhance the bonding force between molecules, thereby activating proteins and other biological macromolecules, putting the cell organism at the highest vibration energy level. Since the biological cells produce resonance effect, far-infrared heat can be transferred to the deeper part under the human skin to rise the temperature at the deeper part, the rise of temperature enables the heat to emit from inside out. The effect leads to telangiectasia, promote blood circulation, strengthen metabolism among tissues, increase tissue regeneration, improve immune capacity, regulate the abnormal excited mental state and thus play a role in health care. Suitable far-infrared material includes far-infrared ceramic powder. In an embodiment of the present invention, the far-infrared ceramic powder includes 10-20 wt. % of SiO2, 10-20 wt. % of MnO2, 15-30 wt. % of Al2O3, 4-10 wt. % of CaO, 15-30 wt. % of MgO, 5-20 wt. % mass of Fe2O3, 20-50 wt. % of ZrO2 and 1-5 wt. % of AgCl. In another embodiment, the far-infrared ceramic powder includes SiO2, TiO2, Al2O3, Na2CO2, borax minerals with a small amount of Fe2O3, MnO2, Co2O3 and CuO. Other suitable far-infrared materials include biochar (such as bamboo charcoal powder and bamboo charcoal fiber) and tourmaline.

In another preferred embodiment, the materials of functional layer 2 also include anti-bacterial materials and/or aromatic material. The antibacterial material has the capacity to kill or inhibit microbial. The aromatic material is suitable for perfuming the air continuously.

In another preferred embodiment, the materials of functional layer 2 also include reinforcing material to alter the mechanical characteristics of the fabric. As discussed above, the reinforcing material can be applied unevenly. Embodiment of reinforcing material includes resin and metal wire.

The above-mentioned additional additives can be added by mixing them with silica gel masterbatch.

Manufacturing Method

The functional layer 2 of the present invention has relatively large thickness, making it impossible to apply to the substrate layer 1 with conventional coating methods, such as mechanical coating and impregnation. The use of adhesives between substrate layer 1 and functional layer 2 is also not preferred, because the adhesives layer may fail over time, leading to an undesirable separation of functional layer 2 and substrate layer 1. The inventor has discovered at least two methods to attach functional layer 2 to substrate layer 1. The substrate layer and the thicker functional layer can be firmly bonded together through these methods.

3D Printing

Traditional 3D printing produces the entire product by using 3D printer. It is hard to be applied to clothing manufacturing. There are very few experimental attempts trying to print the entire garment. It is done by dividing the garment into many small parts, and then the adjacent parts are hinged together. However, the main problem with this type of garment is less flexibility because each part is relatively non-deformable. These widgets are often very thick due to the strength requirement, which further reduces the wearing comfort. The present invention, however, uses a different method. The invention is not making the entire clothes by 3D printing, but prints the functional layer 2 onto the substrate layer 1 by a 3D printer.

Figure 2:
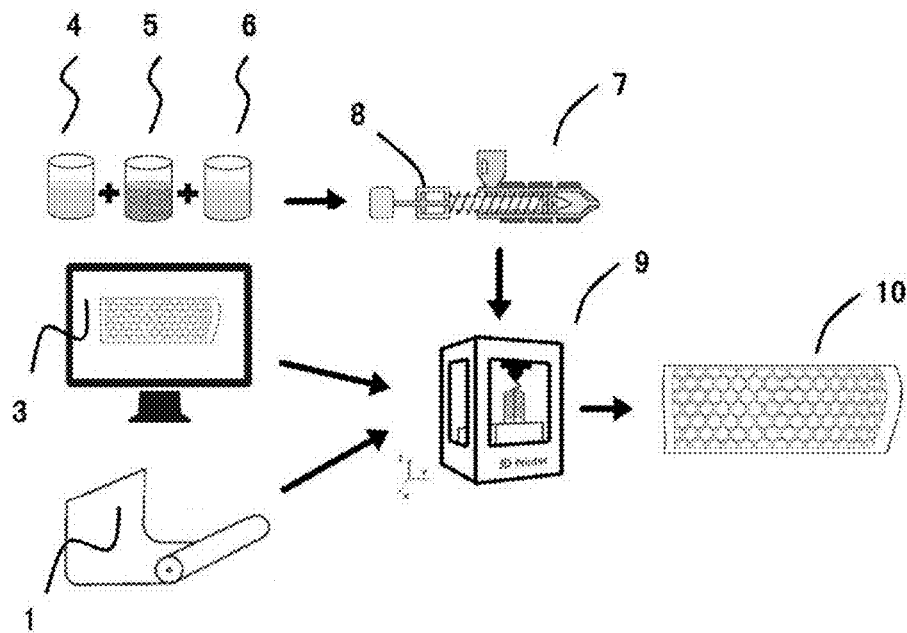
FIG. 2 shows the 3D printing method of manufacturing the functional fabric based on one embodiment of the present invention.

FIG. 2 shows the steps of manufacturing the functional fabric in accordance with the invention using 3D printing technology. First of all, a substrate layer 1 is prepared. The substrate layer 1 can be of any suitable cloth as mentioned above. Then, pre-treatment step to the cloth, such as cleaning the parts which will carry out 3D printing, is performed. Meanwhile, the printing procedure is modelled on computer 3. Consumable supplies also need to be prepared. As aforementioned, the consumable supplies include silica gel masterbatch 4, anion additives 5 and other necessary additives 6. These supplies will be put into the melting chamber 7 to be melted and mixed so as to produce slurry. In another embodiment, not all the consumable supplies are mixed in one melting chamber 7, some additives 6 can be melted in individual melting chambers 7. It is because these additives 6 (such as heat-releasing material and paint) will function more effectively if applied individually or are not to be applied on the entire functional layer 2, or different additives 6 are needed on different parts of the functional layer 2 (for example, to obtain a high elastic part and a low elastic part). Melting chamber 7 is equipped with a temperature sensor to detect the temperature of the supplies.

At the beginning of printing, an extrusion pump 8 will input the consumable supplies to the 3D printer 9 from the melting chamber 7. The 3D printer 9 may include single nozzle or multiple nozzles. When driven by motor, the nozzle(s) can move back and forth in three dimensions according to a preset program and carry out 3D printing. At last, carry out surface treatment on the printed functional fabric 10 to make it smooth.

Due to the nature of 3D printing, the present invention can produce a thicker functional layer 2 which cannot be achieved by the existing technology. In addition, the invention also avoids the problem of insufficient elasticity of garment manufactured solely using 3D printing. The present invention prints the functional layer 2 on the substrate layer 1, such that the clothing made from the fabric so manufactured has elasticity between fabric clothing and 3D printing clothing, and close to the fabric clothing. The elasticity of the functional fabric of the present invention ensures comfort in wearing. Lastly, another obvious advantage of 3D printing is easy to control the properties of different parts of the fabric. As aforementioned, the present invention desires to apply different thickness, composition and structure of functional layer 2 on different positions of the substrate layer (i.e., the different positions of the clothing). It is easily achievable by 3D printing technology.

Compression Molding

Figure 3:
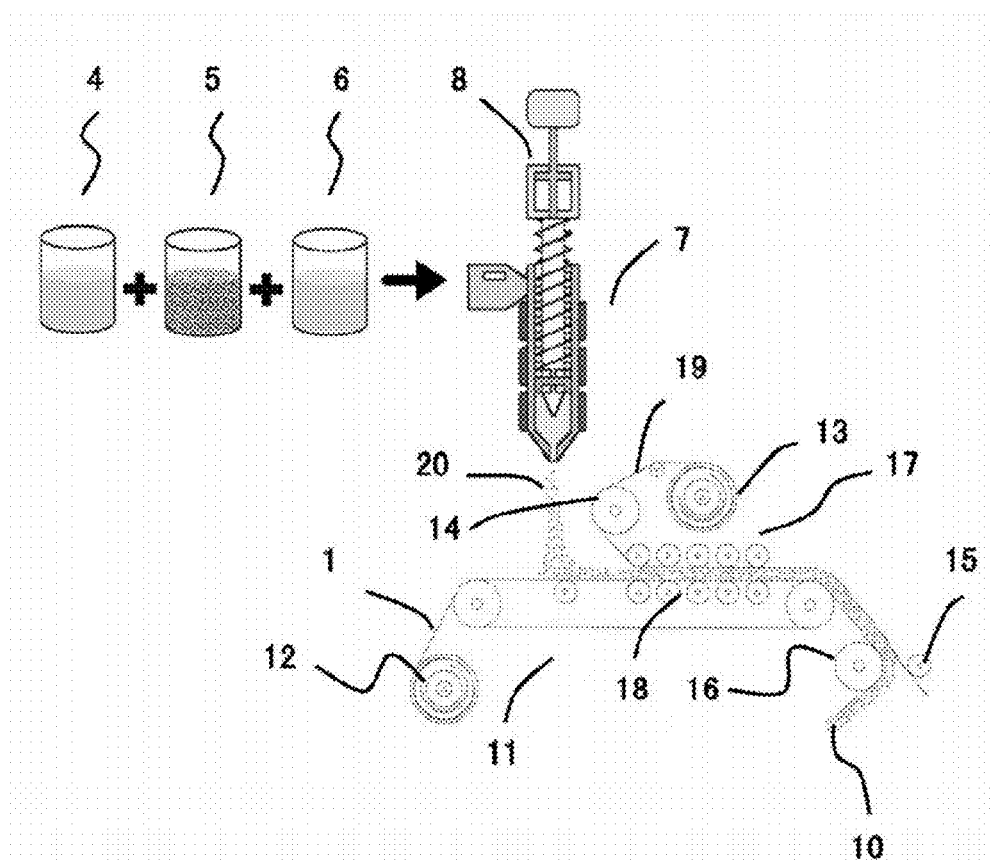
FIG. 3 shows the compression molding method of manufacturing the functional fabric based on one embodiment of the present invention.

Another method to apply functional layer 2 of the present invention to substrate layer 1 is compression molding. As shown in FIG. 3, this method also needs preparation and pre-treatment of substrate layer 1, and melt and mix of consumable supplies 20. Compression molding operation is performed with a molding device 11. With the help of rollers 12 and 16, the substrate layer 1 is transported on the molding device 11. Melted consumable supplies 20 are supplied to the substrate layer 1 through melting chamber 7 upstream of the molding device 11. After that, rollers 13, 14 and 15 are used to cover the mould 19 on the free surface of the melted consumable supplies 20. The surface of mould 19 facing the surface of melted consumable supplies 20 has the three-dimensional structure complementary with the three-dimensional structure of functional layer 2. With the help of rollers 17 and 18, press the mould 19, substrate layer 1 and melted consumable supplies 20 together for a while, allows the full combination of substrate layer 1 and supplies 20 to allow sufficient bonding of the substrate layer 1 and the consumable supplied 20 to produce the functional fabric 10 with a functional layer 2 having desired structures. Then, separate the finished functional fabric 10 and mould 19.

The compression molding method of the present invention allows a relatively thick functional layer 2. The desirable three-dimensional structure, irregular thickness and other structural features of functional layer 2 can be readily achieved by designing the shape of cavity of the mould 19.

In another embodiment, the heat-releasing material can be provided as a separate layer within the functional layer. This is done by producing the conductive nano-particles of composite carbon fiber powder as fluid-like material, and hot press the material onto the polyester film. The so acquired nano heating film is then incorporated onto the functional fabric of the present invention.

Technical Effect

The functional fabric 10 with the structure in accordance with the present invention produced based on the aforementioned method is able to release anion stably under a static condition. With different components and structures, the anion detector COM-3010PRO of Japanese COM SYSTEM, INC. can detect a concentration of 1,000-6,000 anions per cubic centimeter, particularly 2,000-5,000 anions per cubic centimeters and more particularly 3,500 anions per cubic centimeters. The following experiments conducted by the inventor show that wearing the clothing made with the fabric of the present invention can significantly improve health condition.

(1) Experiment with Respect to Muscle Injury Caused by Sports Activity

In the study of muscle injury caused by sports activity, the content of Creatine Kinase is often used as an indirect indicator of muscle injury. Creatine Kinase is also known as Creatine Phospholinase Kinase, it is a kind of enzyme produced by a variety of body tissues that converts the creatine to creatine phosphate with the energy generated by adenosine triphosphate (ATP) converting to adenosine diphosphate (ADP). In the course of strenuous exercise, muscles experience strong contraction, and creatine kinase is released into the bloodstream from muscle tissue, and causes the rupture of membrane of muscle cells. For example, after the completion of marathon, the content of creatine kinase can be as high as 500-3,000 U/I. After, high-strength muscle contraction, the content of creatine kinase can be as high as 25,000 U/I. This kind of severe muscle injury will instantly reduce the muscle strength by 50%, and it takes at least 10 days to fully recover.

The inventor has invited 12 males between the ages of 45 to 65 to participate in the experiment. Among them, 6 are in the control group and the other 6 are in the experiment group. All experiment participants wore mask, carried out 20 minutes exercise on running, cycling and stepping equipments. The only difference was that the control group wore ordinary mask and the experiment group wore mask made by fabric of the present invention which is detected to have an anion concentration of 3,000 per cubic centimeters. Before and after the exercise, venous blood samples were taken from all participants to measure the following data:

Number of white blood cell
The percentage of lymphocytes
Serum creatine kinase (CK) content
Serum dehydrogenase (LDH) content
Serum lactate (lactate) content In the first experiment, the inventor compared the group difference of changes of CK, LDH and lactate caused by the exercise. Table 3 shows the measurement results of the average levels of CK, LDH and lactate in the serum of each group 1 hour before and after the 20-minute exercise. It can be sees that before the exercise, the CK, LDH and lactate level of both the control group and experiment group were similar, but differences appeared after the exercise.

TABLE 3

Average levels of CK, LDH and lactate in the serum of the each group before and after the exercise

| | Before the Exercise | | After the Exercise | |
|---|---|---|---|---|
| | Control Group | Experiment Group | Control Group | Experiment Group |
| CK | 179.17 ± 67.90 | 174.33 ± 112.75 | 195.00 ± 61.67 | 187.00 ± 120.45 |
| LDH | 350.67 ± 84.38 | 359.17 ± 109.53 | 435.83 ± 113.61 | 420.33 ± 114.53 |
| Lactate | 3.01 ± 0.56 | 3.23 ± 0.68 | 5.92 ± 1.64 | 4.38 ± 1.23 |

Table 4 shows the changes of average levels of CK, LDH and lactate in the serum of each group 1 hour before and after the 20-minute exercise. We can see that the increase of CK, LDH and lactate of the experiment group was smaller than that in the control group. In particular, the increase of lactate level of the experiment group was significantly smaller.

TABLE 4

Changes of CK, LDH and lactate in serum Lactate

| Group (Number) | CK | LDH | Lactate |
|---|---|---|---|
| Control (6) | 15.83 ± 13.09 (+11.25%) | 85.17 ± 49.89 (+24.01%) | 2.90 ± 1.69 (+100.90%) |
| Experiment (6) | 12.67 ± 8.45 (+7.2%) | 61.17 ± 48.57 (+18.12%) | 1.15 ± 0.71 (+34.76%) |

In another experiment, one participant was selected to conduct the aforementioned 20-minute exercise with ordinary mask and mask made with fabric of the present invention respectively, and the levels of CK, LDH and lactate in the serum was measured 1 hour before and after the 20-minute exercise. As shown in Table 5, the levels of CK, LDH and lactate of the experiment group have smaller increase.

TABLE 5

Levels of CK, LDH and lactate in the serum before and after the exercise

| | Before the Exercise | After the Exercise | |
|---|---|---|---|
| | | Control Group | Experiment Group |
| CK | 116.00 | 157.00 | 125.00 |
| LDH | 205.00 | 226.00 | 224.00 |
| Lactate | 2.30 | 4.80 | 3.10 |

The above experiments show that wearing the clothing made by the fabric of the present invention can reduce the muscle injury caused by sports activities to a certain degree.

(2) Inflammation Thermogram Experiment

The inventor also conducted a series of experiments to test the beneficial effects of the fabric of the present invention on alleviating human body inflammation. The inventor have thermogram-imaged the inflammation parts of human body t, and then applied the bandage made from the fabric in accordance with the present invention on the site of inflammation, and observed the changes of the thermogram over time. The red part of the thermogram indicates the hotter parts (i.e. the site of inflammation, also indicated by an arrow in the figures), the deeper the red the more serious inflammation. The green colour represents normal parts.

Figure 4A:
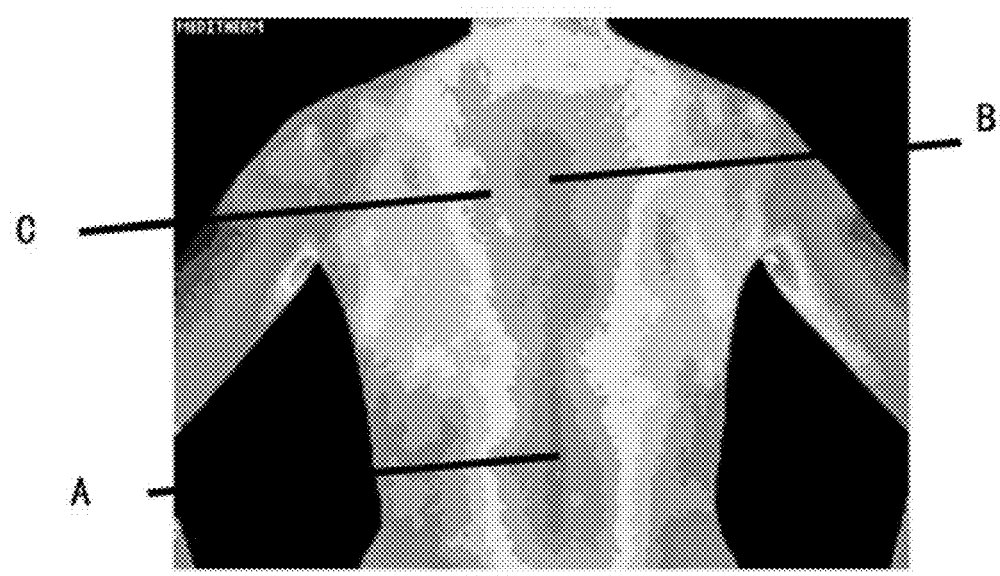
FIGS. 4A-4D show the thermogram experiment carried out on patients with lumbar pain with the functional fabric based on one embodiment of the present invention.
Figure 4B:
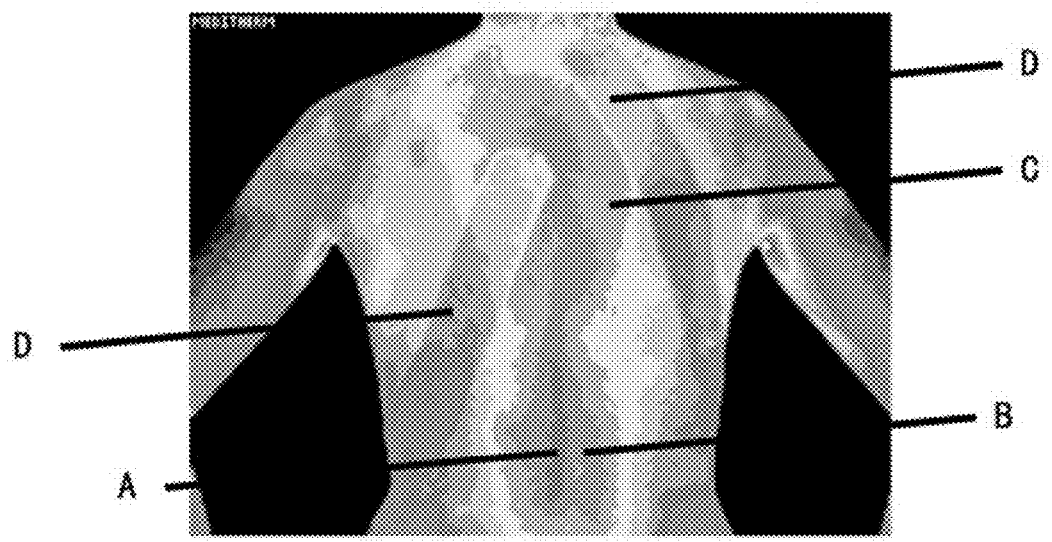
Figure 4C:
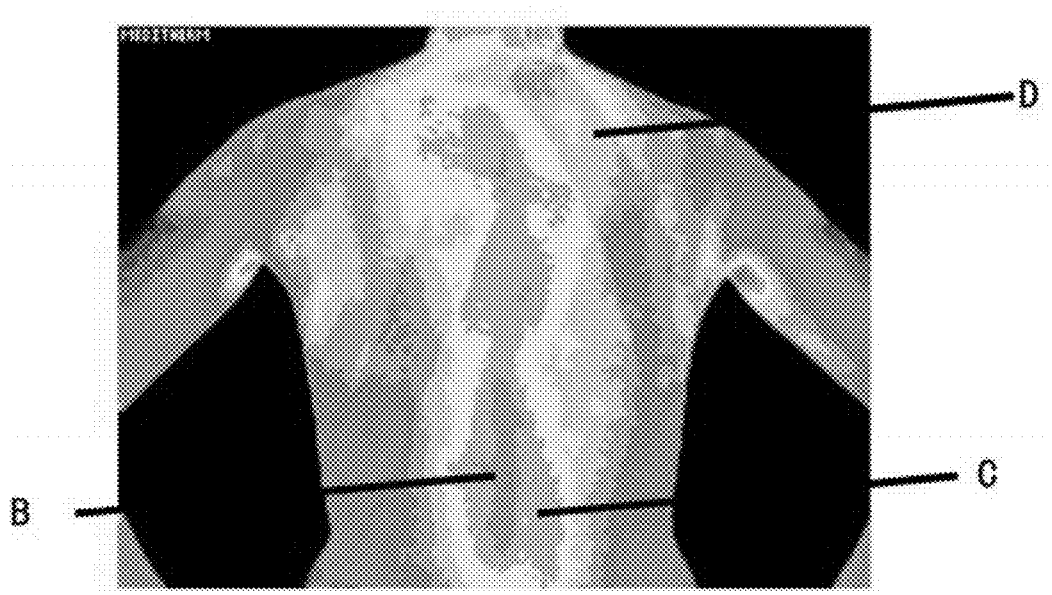
Figure 4D:
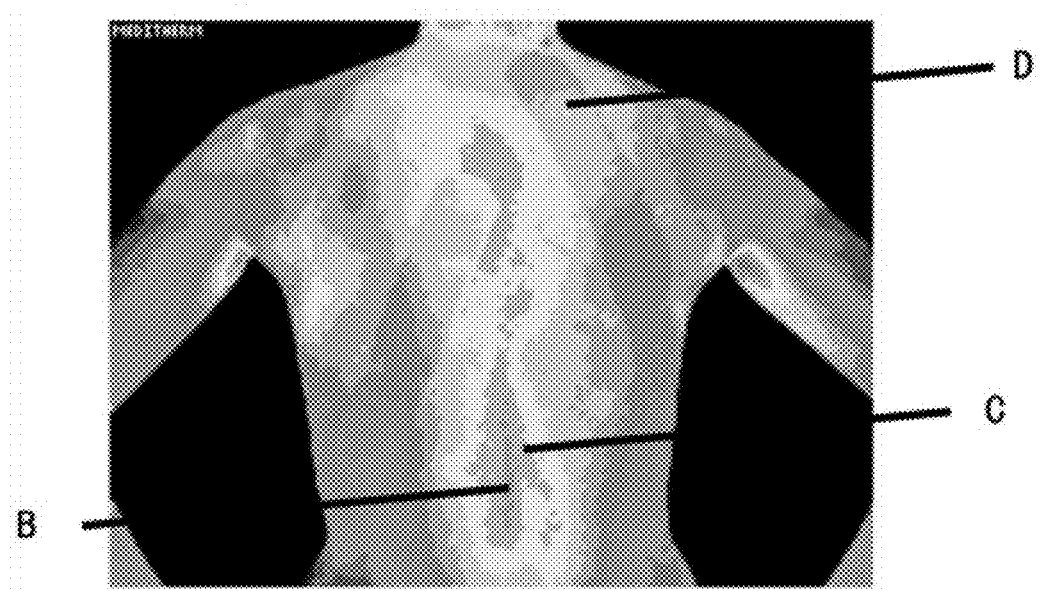

FIGS. 4A-4D show the thermogram experiment of a patient with lumbar pain. FIG. 4A shows the thermogram of the back before applying the bandage in accordance with the present invention; it can be seen that there are small red areas A along the lumbar, large orange areas B and yellow areas C surrounding them, indicating inflammation in these areas. FIG. 4B shows the thermogram after applying the bandage for 5 minutes, it can be seen that at least in areas with bandage applied, the orange and yellow colors have turned to green D. In other words, the area of inflammation has been reduced. FIGS. 4C and 4D show the thermogram 10 minutes and 15 minutes thereafter respectively, it can be seen that the red areas A have practically disappeared and the orange areas B and yellow areas C of the entire back have reduced significantly. The above experiment shows that after applying the bandage of the present invention, the inflammation of the lumbar has been greatly relieved.

Figure 5A:
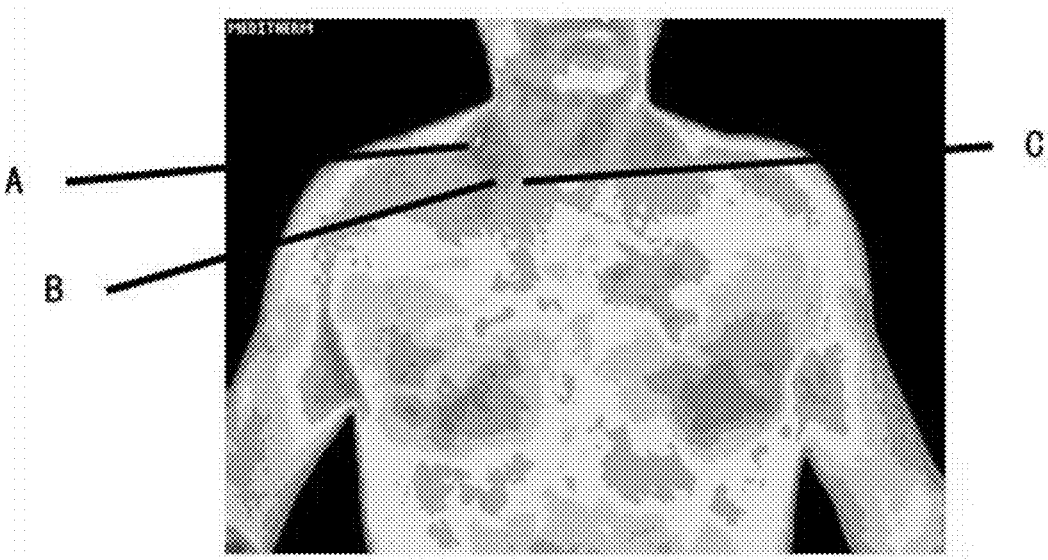
FIGS. 5A-5E shows the thermogram experiment carried out on patients with neck pain with the functional fabric based on one embodiment of the present invention.
Figure 5B:
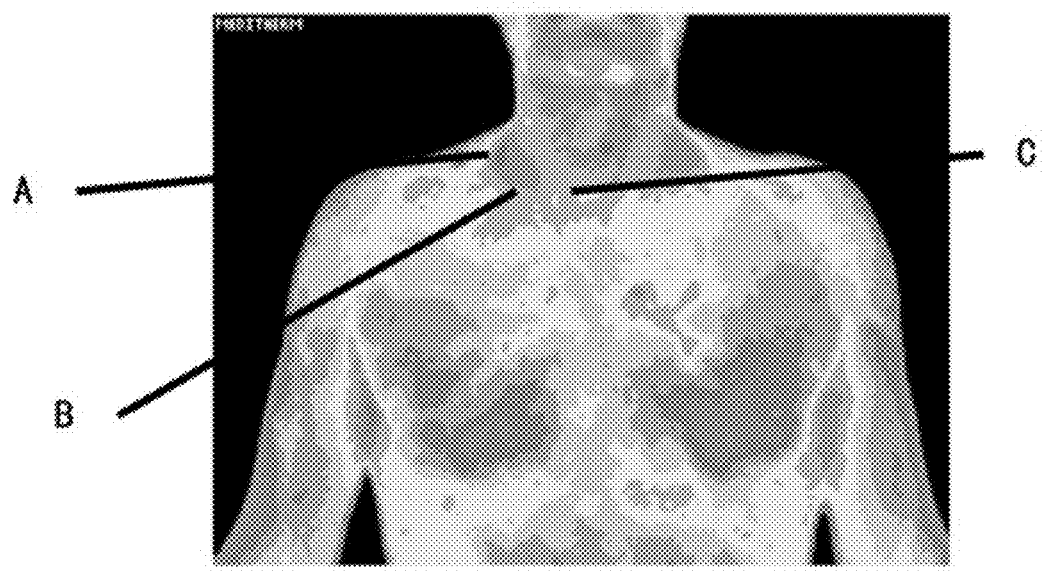
Figure 5C:
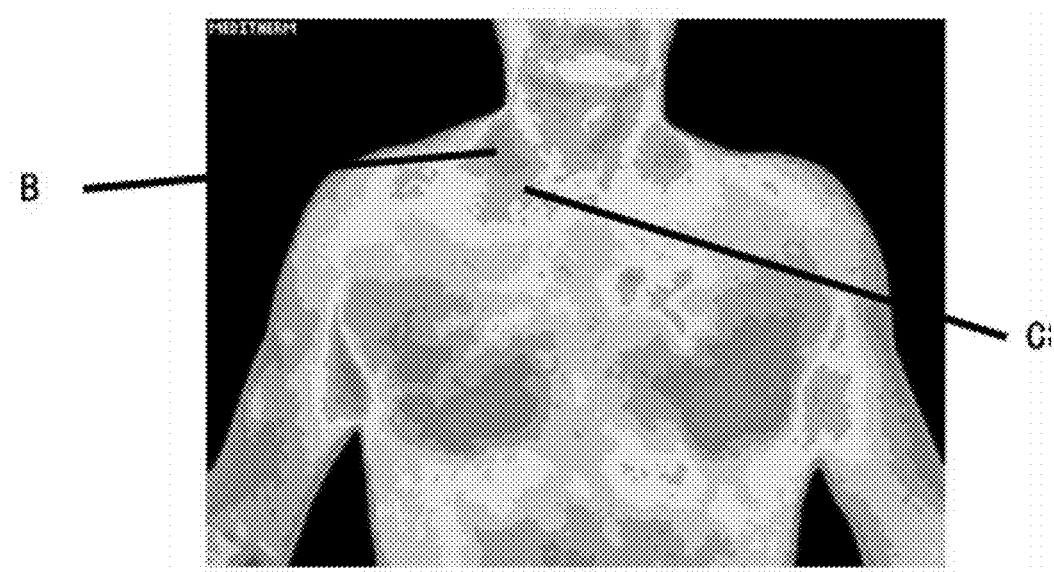
Figure 5D:
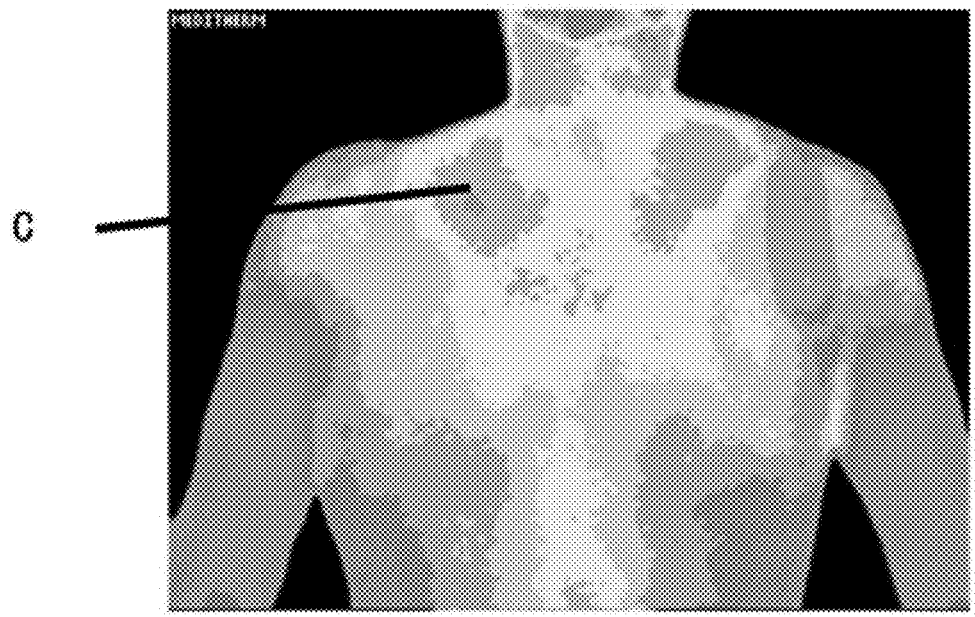
Figure 5E:
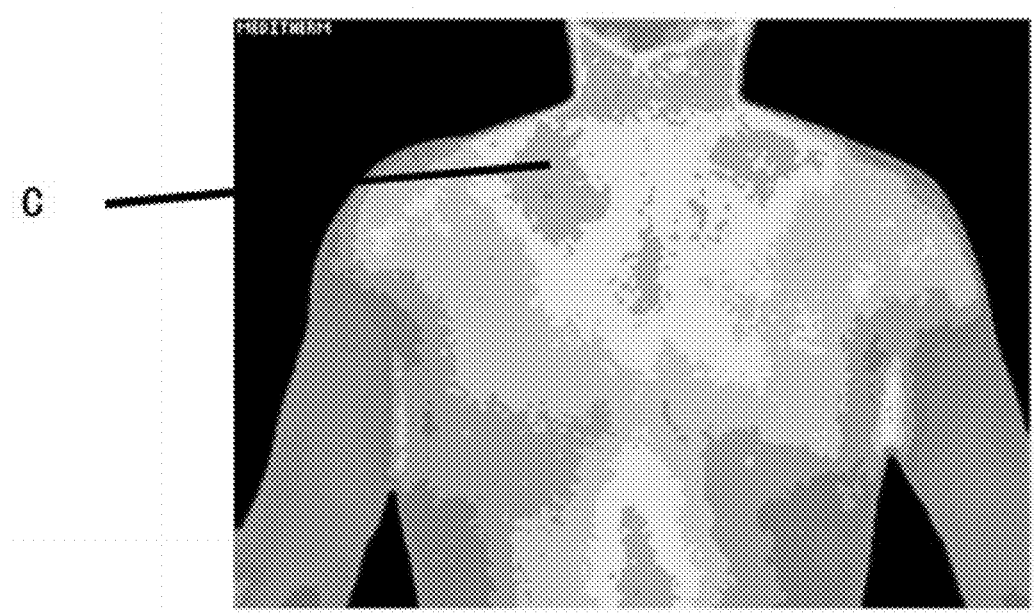

FIGS. 5A-5E show the thermogram experiment of a patient with right neck pain. FIG. 5A shows the thermogram of the neck before applying the bandage in accordance with the present invention; it can be seen that there are significant red areas A on the right neck, deep orange areas B surrounding them and orange areas C further surrounding them, indicating inflammation in these areas. FIG. 5B shows the thermogram after applying the bandage for 5 minutes; it can be seen that the red areas A, deep orange areas B and orange areas C have been significantly reduced. The thermogram FIG. 5C after 10 minutes shows that the red areas A have practically disappeared, and the deep orange areas B and orange areas C are further reduced. The thermogram FIG. 5D after 15 minutes shows that the deep orange areas B have basically disappeared and only orange areas C remain. The thermogram FIG. 5E after 20 minutes is basically the same as 15 minutes, indicating that the relief of inflammation is maintained. The above experiment shows that after applying the bandage of the present invention, the inflammation on the right neck has been greatly relieved.

Figure 6A:
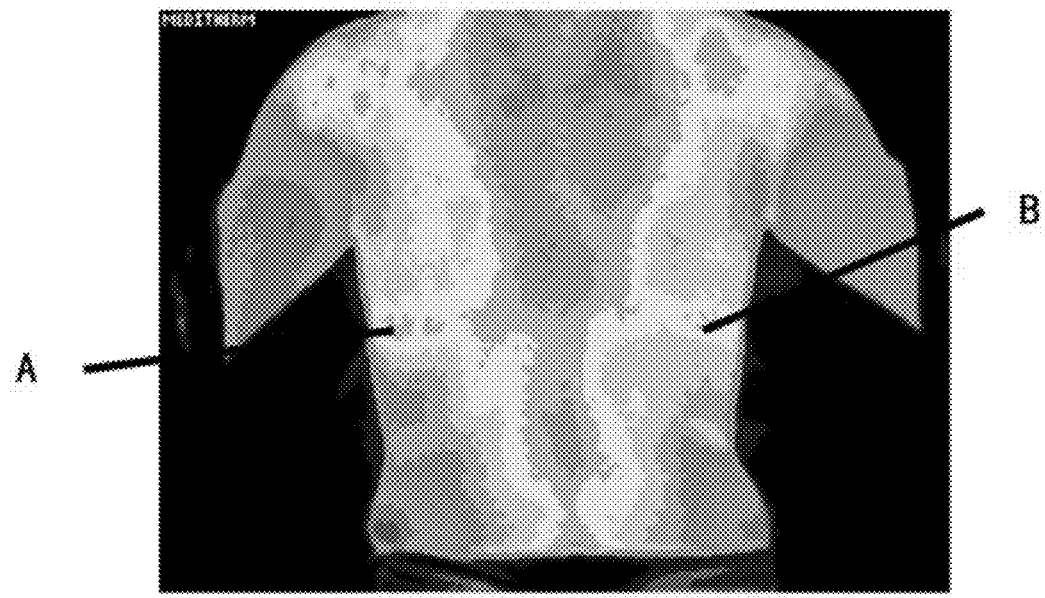
FIGS. 6A-6C shows the thermogram experiment carried out on patients with back pain with the functional fabric based on one embodiment of the present invention.
Figure 6B:
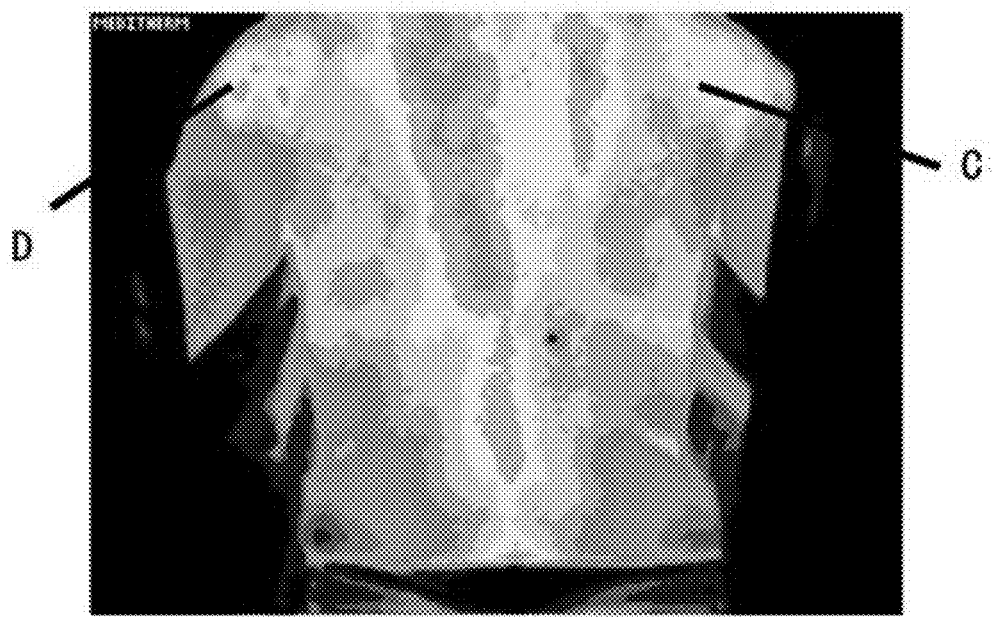
Figure 6C:
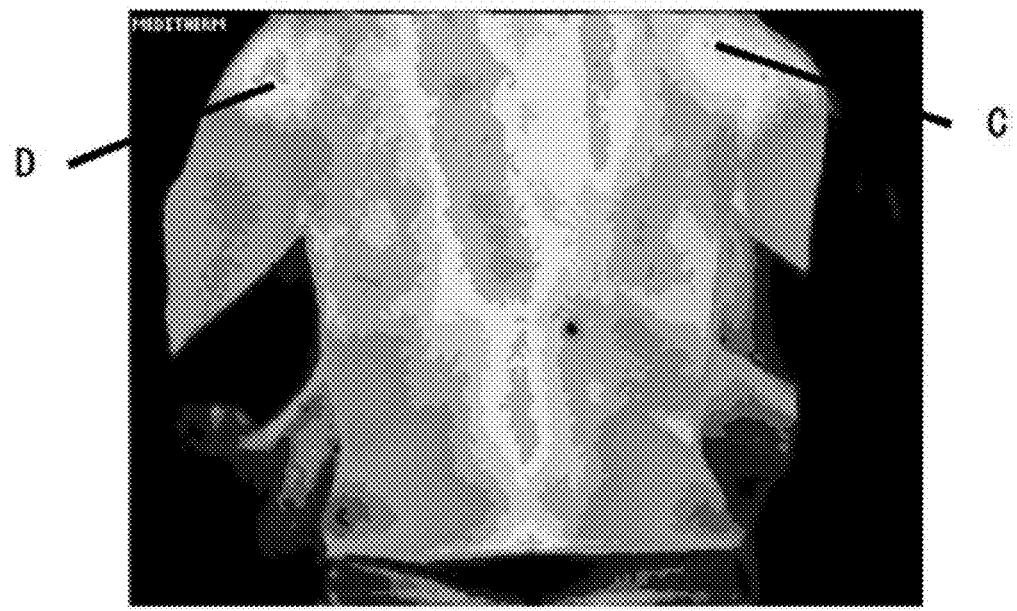

FIGS. 6A-6C show the thermogram experiment of a patient with back pain on both sides. FIG. 6A shows the thermogram of the back before applying the bandage in accordance with the present invention; it can be seen that there are strip-shape yellow areas B and small orange areas A therein on both sides of the back, indicating inflammation in these areas. FIGS. 6B and 6C show the thermogram of the back after applying the bandage of the present invention for 5 minutes and 10 minutes respectively. It can see that after applying the bandage of the present invention for 5 minutes, the strip-shape yellow areas B and orange areas A have basically disappeared. As a comparison, the orange areas C and yellow areas D on the shoulder remained unchanged. The above experiment shows that after applying the bandage of the present invention, the inflammation on both sides of the back has been greatly relieved.

Figure 7A:
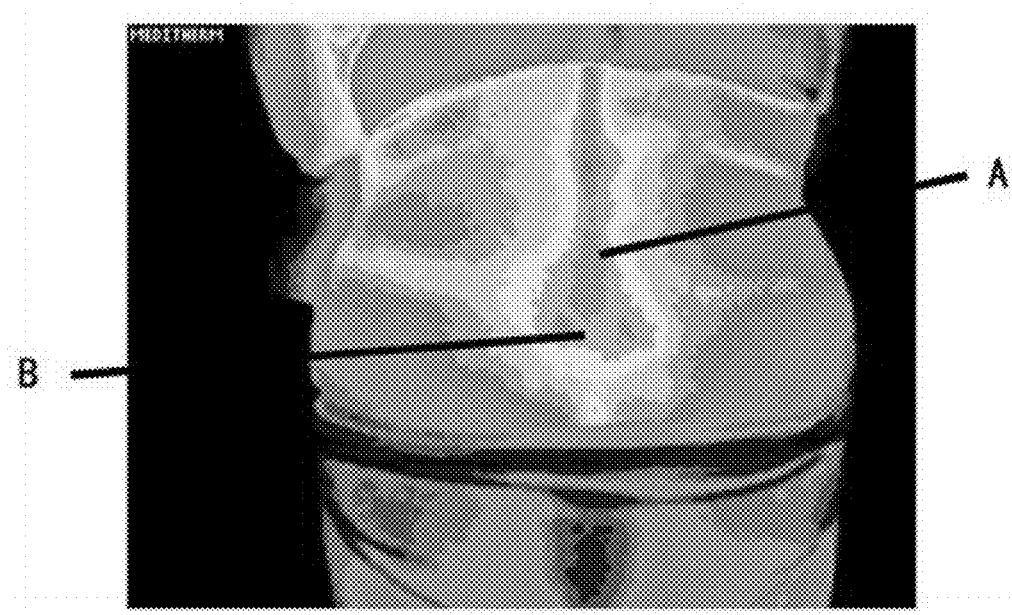
FIGS. 7A-7D shows the thermogram experiment carried out on patients with waist pain with the functional fabric based on one embodiment of the present invention.
Figure 7B:
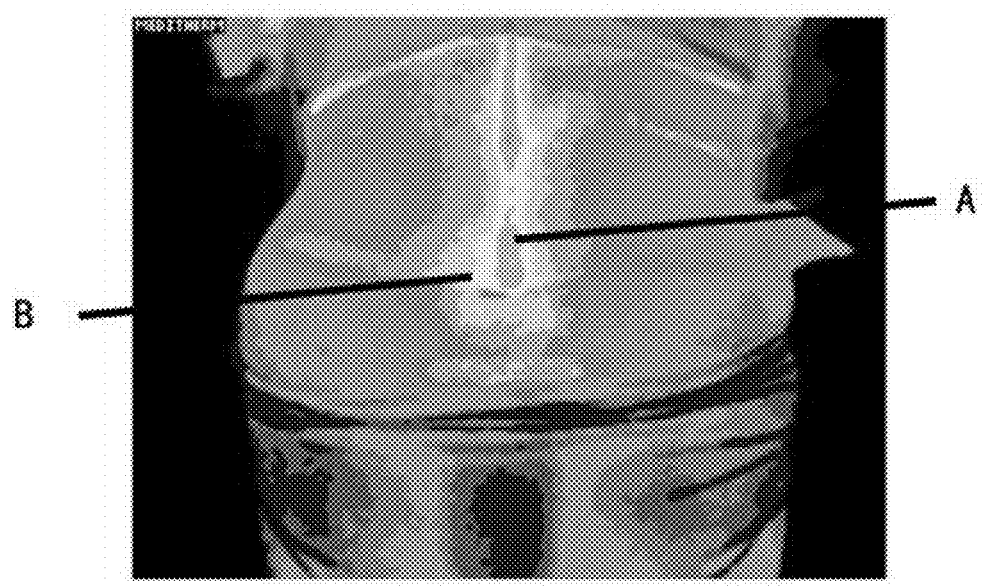
Figure 7C:
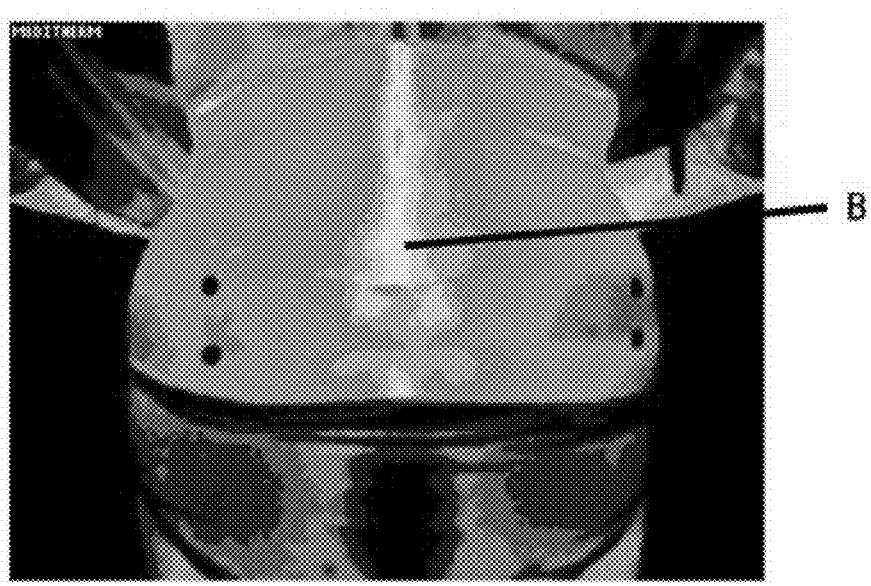
Figure 7D:
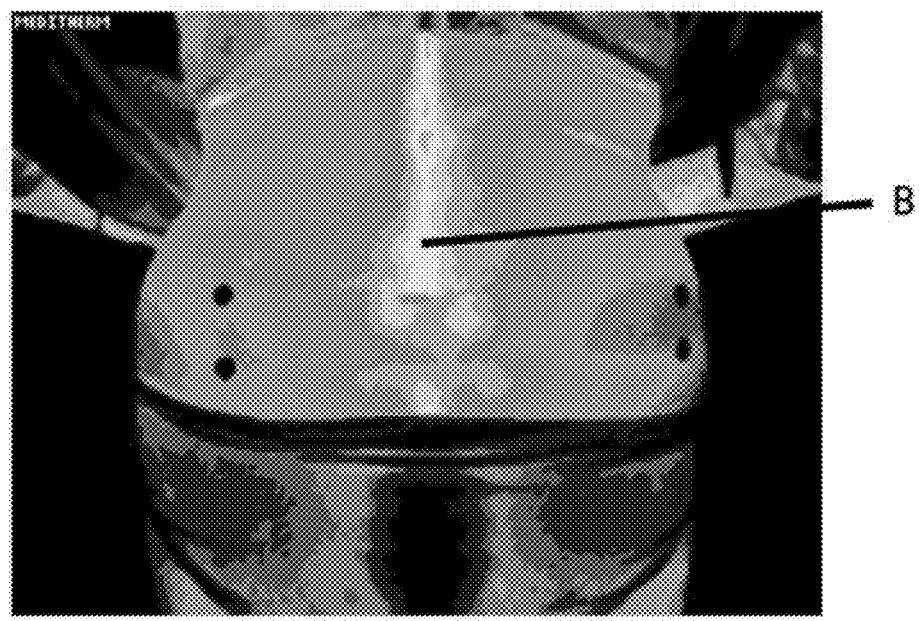

FIGS. 7A-7D show the thermogram experiment of a patient with waist pain. FIG. 7A shows the thermogram of the waist before applying the bandage in accordance with the present invention; it can be seen that there are significant orange areas A and surrounding yellow areas B at the waist, indicating inflammation in these areas. FIG. 7B shows the thermogram of the waist after applying the bandage of the present invention for 5 minutes. It can be seen that the orange areas A and yellow areas B have been significantly reduced. FIGS. 7C and 7D show the thermogram of the waist after applying the bandage of the present invention for 10 minutes and 15 minutes respectively. It can be seen that the orange areas A have basically disappeared and the yellow areas B have been further reduced and maintained. The above experiment shows that after applying the bandage of the present invention, the inflammation on the waist has been greatly relieved.

The two experiments mentioned above indicate that the functional fabric of the present invention can bring significant improvement to human health by high concentration of anion.

The aforementioned are only part of the embodiments of the invention. Therefore, any equivalent variations or modifications of the structure, features and principles under the scope of the present invention, or any combination of the embodiments of the present invention, are all within the scope of the present invention.

The invention claimed is:

1. A 3D printing method for manufacturing a functional fabric, comprising the following steps:
    (a) providing a cloth as a substrate layer of the functional fabric;
    (b) modeling a functional layer of the functional fabric on computer;
    (c) providing, melting and mixing a silica gel masterbatch and anion additives, and
    (d) 3D printing the functional layer on the substrate layer using a 3D printer.

2. The 3D printing method according to claim 1, further comprising the following step:
    (e) providing one or more additional additives of heat-releasing materials, far-infrared materials, antibacterial materials, aromatic materials and reinforcing materials, the additional additives are melted separately or mixed and melted together with silica gel masterbatch and anion additives, and supplied to the 3D printer.

3. The 3D printing method according to claim 1, further comprising the following step:
    (f) printing on different locations of the substrate layer a functional layer of varying thickness and/or varying configurations and/or varying components.

* * * * *